United States Patent [19]
Fling et al.

[11] Patent Number: 4,736,237
[45] Date of Patent: Apr. 5, 1988

[54] CHROMA DEMODULATION APPARATUS FOR USE WITH SKEW CORRECTED CLOCK SIGNAL

[75] Inventors: Russell T. Fling, Noblesville; Eric D. Romesburg, Indianapolis, both of Ind.

[73] Assignee: RCA Corporation, Princeton, N.J.

[21] Appl. No.: 32,829

[22] Filed: Mar. 31, 1987

[51] Int. Cl.$^4$ .................. H04N 9/66; H04N 9/475
[52] U.S. Cl. ................................. 358/19; 358/25; 358/23
[58] Field of Search .................. 358/23, 19, 17, 25, 358/40, 22, 188, 36, 37, 320, 324; 371/1

[56] References Cited

U.S. PATENT DOCUMENTS

| | | | |
|---|---|---|---|
| 4,595,953 | 6/1986 | Willis | 358/183 |
| 4,612,568 | 9/1986 | den Hollander et al. | 358/25 X |
| 4,623,925 | 11/1986 | Tults | 358/183 |
| 4,646,136 | 2/1987 | Kouyama | 358/19 |
| 4,677,463 | 6/1987 | Aben | 358/40 |

OTHER PUBLICATIONS

Presentation by Tom Nillesen at Jun. 1985 International Conference on Consumer Electronics in Chicago entitled "Line-Locked Digital Colour Decoding".

U.S. patent application, Ser, No. 771,770, entitled "Timing Correction Circuit for a Picture-In-Picture Television System".

U.S. patent application, Ser. No. 845,698 entitled "Digital Phase Locked Loop Stabilization Circuitry Including a Secondary Digital Phase Locked Loop Which May be Locked at an Indeterminate Frequency".

Primary Examiner—Howard W. Britton
Assistant Examiner—Victor R. Kostak
Attorney, Agent, or Firm—Paul J. Rasmussen; Eric P. Herrmann; Dilip A. Kulkarni

[57] ABSTRACT

An apparatus is disclosed for generating a burst-locked, color subcarrier representative signal $\phi_{sc}$ from a skew-corrected clock signal MCS (which is reset once every horizontal line) and a skew error signal SES (indicative of the once-a-line phase adjustment of the skew-corrected clock signal). In accordance with another feature of the invention, a chroma demodulation apparatus is provided for generating a pair of color difference signals R-Y and B-Y in response to the internally-generated $\phi_{sc}$ signal.

13 Claims, 5 Drawing Sheets

CHROMA DEMODULATION APPARATUS FOR USE WITH SKEW CORRECTED CLOCK SIGNAL

This invention relates to an apparatus for generating a pair of color difference signals (R-Y) and (B-Y) from digital samples produced by sampling a composite video signal CVS by a skew corrected master clock signal MCS.

BACKGROUND

In a digital TV receiver, a broadcast analog color video signal is applied to a conventional receiving antenna. The signal received by the antenna is processed by an analog tuner and intermediate frequency (IF) circuitry. A baseband composite video signal CVS from the IF circuitry is applied to an analog-to-digital (A/D) converter. The A/D converter develops binary or digital representations of the analog composite video signal CVS in response to a sampling or master clock signal MCS. The binary samples are processed in digital circuits to appropriately condition the luminance Y (luma) and chrominance C (chroma) components of the composite video signal CVS for application to the matrixing circuitry of the TV receiver. The Red (R), Green (G) and Blue (B) signals developed by the matrix circuits are converted back to the analog format for application to the kinescope.

For chroma demodulation, it is advantageous to set the frequency of the sampling clock signal MCS at four (4) times the color subcarrier rate $F_{sc}$, and to phase lock the 4 $F_{sc}$ clock signal to the color burst signal BS incorporated in the incoming composite video signal CVS. Sampling the chrominance signal C using a 4 $F_{sc}$ burst locked clock (BLC) produces the following sample sequence: $-(B-Y)$, $-(R-Y)$, $(B-Y)$, $(R-Y)$, $-(B-Y)$ and so on. Demodulation may be accomplished by merely demultiplexing the sample stream into separate (R-Y) and (B-Y) data streams.

However, for memory based features (e.g., pix-in-pix, freeze picture, zoom, recursive filtering, etc.), it is desirable to process the video signal with a line locked clock (LLC). A line locked clock produces a fixed integer number (e.g, 910) of sampling points per horizontal line. This simplifies memory based video features processing (e.g., line, field or frame memories), because the respective samples are vertically aligned (i.e., TV raster is orthogonally sampled).

For a standard NTSC video signal (e.g., broadcast TV signal), a sampling clock frequency, which is an even integer multiple of the color subcarrier frequency $F_{sc}$, contains a fixed integer number of clock pulses in every horizontal line period. The color subcarrier frequency $F_{sc}$ is established at 455/2 times the horizontal line frequency $F_H$ (i.e., $F_{sc}=(455/2)\times F_H$) in a standard NTSC TV signal. A sampling clock frequency $F_{MCS}$ of 4 $F_{sc}$ has exactly 910 clock periods ($4\times 455/2$) in every horizontal line period. For a standard NTSC video signal, a clock signal may be concurrently burst locked and line locked, thereby facilitating both chroma demodulation and memory based applications (e.g., zoom).

However, not all NTSC compatible TV signals conform precisely to the NTSC broadcast standard format. For example, signals produced by a video cassette recorder (VCR) have varying horizontal line periods in the reproduced signal. This results in a variation in the number of clock pulses developed per horizontal line (e.g., 909.9, 910, 910.1, etc.). In general, for non-standard TV signals, it is not possible that a clock signal be simultaneously burst locked and line locked.

Two previously known approaches for processing non-standard TV signals in the digital domain employ either a burst locked clock or a line locked clock. The use of a burst locked clock simplifies chroma demodulation. However, a burst locked clock produces a variation in the number of clock pulses per horizontal line, and therefore, causes a line-to-line variation in the phase of the clock signal relative to the horizontal synchronizing component. The line-to-line phase variation of the clock signal relative to the horizontal sync signal causes misalignment of the respective picture elements (pixels) from successive lines of the TV raster, thereby requiring additional processing for memory-based applications.

In order to compensate for the line-to-line misalignment of the pixels before they are written into the memory in a burst locked clock system, the input signal samples are time shifted or skew corrected for the phase differences between the incoming horizontal sync pulses IHSP's and the sampling clock pulses MCSP's. Additionally, the signal samples read out from the memory are corrected for skew errors prior to their application to the RGB matrix of the TV receiver. U.S. Pat. No. 4,638,360, entitled "Timing Correction for a Picture-In-Picture Television System", describes illustrative circuitry for correcting timebase errors in the incoming and outgoing signals in a memory-based video signal processing system employing a burst locked clock.

Alternately, one may use a line locked clock for sampling non-standard TV signals. Although this simplifies video features processing (e.g., pix-in-pix), it complicates the chroma demodulation operation when the TV signal is non-standard. Refer to a paper presented by Tom Nillesen, entitled "Line Locked Digital Colour Decoding", at the International Conference on Consumer Electronics in June, 1985 in Chicago for details of a chroma demodulation apparatus that operates in a line locked clock system.

A commonly-assigned, currently-filed U.S. patent application, Ser. No. 032,258 filed in behalf of the same inventors, and entitled "Television Receiver Having a Skew Corrected Clock", describes still another approach for sampling a non-standard TV signal. An A/D converter generates digital samples of an incoming composite video signal CVS in response to a skew corrected master clock signal MCS. The skew corrected clock signal MCS has its phase adjusted at the start of every horizontal line period, and has a constant frequency that is a fixed multiple L (e.g., 4) of the color subcarrier frequency $F_{sc}$ between successive phase adjustments.

SUMMARY OF INVENTION

In accordance with this invention, a chroma demodulation apparatus is disclosed that operates with a skew corrected clock signal MCS, and a skew error signal SES indicative of the once-a-line phase adjustment of the clock signal. The chroma demodulation apparatus includes means responsive to the skew corrected clock signal MCS and the skew error signal SES for internally generating a burst-locked color subcarrier representative signal $\phi_{sc}$. The chroma demodulation apparatus further includes means coupled for receiving the digital samples of the composite video signal CVS and responsive to the internally-generated, burst-locked, color subcarrier representative signal $\phi_{sc}$ for generating a pair of color difference signals R-Y and B-Y.

IN THE DRAWINGS

FIG. 7 is a partial block diagram of an apparatus for generating a new line signal $\overline{NLS}$ for use in the FIG. 6 chroma demodulation apparatus.

DETAILED DESCRIPTION

Figure 1:
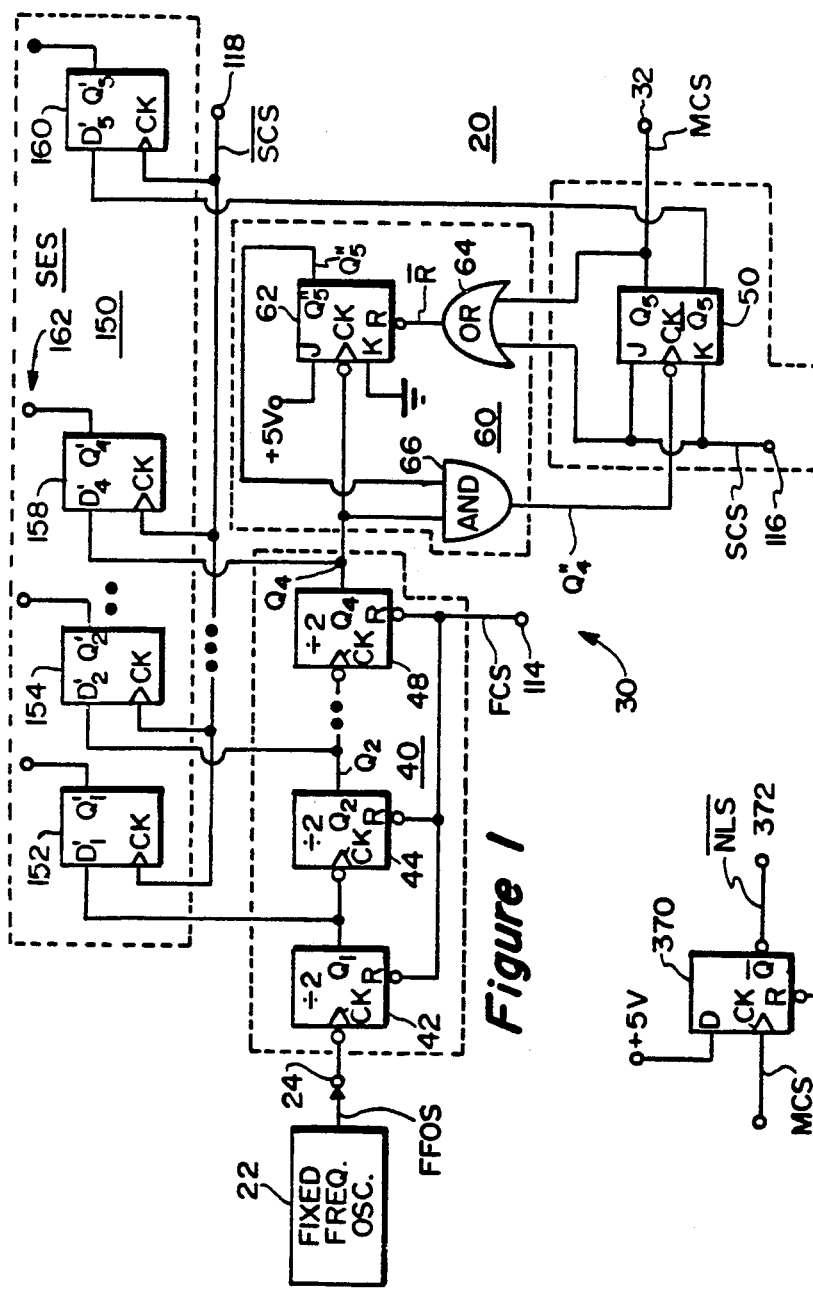
FIG. 1 is a block diagram of an apparatus for generating a skew-corrected master clock signal MCS, and an accompanying skew error signal SES.

In the DRAWINGS, the lines interconnecting various blocks represent either single conductor connections carrying analog signals or multi-conductor buses carrying multi-bit parallel digital signals, as the case may be.

It will be readily appreciated by those skilled in the video signal processing art that many of the functions described hereinbelow may be practiced in either digital or analog domain.

It is assumed that the incoming video signal nominally conforms to the NTSC standard format. Examples of signals conforming nominally to the NTSC standard format are video signals produced by a video cassette recorder or a video disc player (hereinafter, non-standard video signals). It is further assumed that the desired, nominal clock frequency $F_{MCS}$ is four (4) times the color subcarrier frequency $F_{sc}$.

The FIG. 1 clock generating apparatus 20 (which is the subject matter of a commonly-assigned, concurrently-filed U.S. patent application) includes a free running oscillator 22 for providing an asynchronous, fixed frequency signal FFOS. The frequency $F_{FFOS}$ of the free running oscillator 22 is established at a fixed integer multiple K (e.g., 32) of the desired nominal frequency (e.g., $4 F_{sc}$) of the skew corrected clock signal MCS.

A frequency divide-by-K circuit 30 (hereinafter, divider) is coupled to the output terminal 24 of the asynchronous oscillator 22 for generating the skew corrected master clock signal MCS at its output terminal 32. The phase of the clock signal MCS is reset at the start of every line in the manner explained below.

An advantage of the skew corrected clock signal MCS is that the timing of the pixels is consistent from line to line, since the clock is reset at the start of every horizontal line. This aids implementation of memory based applications—such as, pix-in-pix, zoom, picture freeze, etc.

The choice of the oscillator frequency is determined by the timing resolution required for the picture elements. It is advantageous to establish the multiple K ($F_{FFOS}/4 F_{sc}$) equal to an integer power or an integer multiple of two (e.g., 128) to simplify the design of the divider 30. A 1.832727 GHz oscillator frequency $F_{FFOS}$, for example, is 128 times the desired nominal frequency 14.31818 MHz ($4 F_{sc}$) of the master clock signal MCS. It results in 0.546 nsec of timing resolution for the television raster.

The divider 30 comprises a divide-by-m circuit 40 (where m is a fixed integer) connected in series with a JK flip-flop 50. When m is a power of 2 (e.g., 16), the divide-by-m circuit 40 can be implemented with a plurality of toggle flip-flops 42, 44 . . . and 48 connected in a ripple configuration in the manner shown in FIG. 1. The toggle flip-flops 42-48 are reset once every horizontal line in response to a first control or timing signal FCS.

Figure 2:
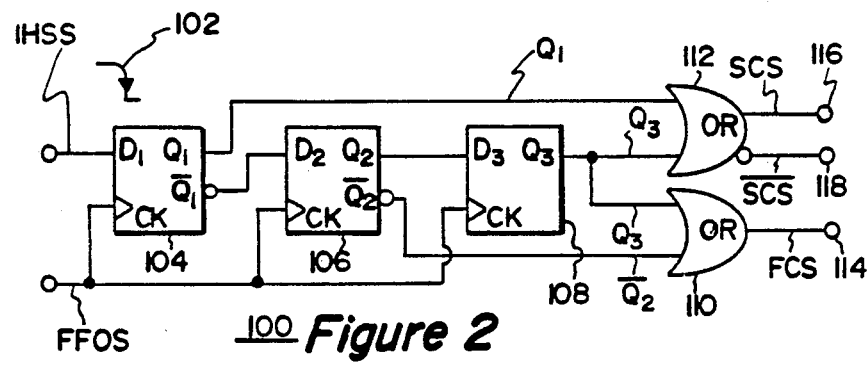
FIG. 2 is a logic schematic of an apparatus for generating a pair of control signals FCS and SCS for use in the FIG. 1 clock signal generating apparatus.

FIG. 2 depicts an apparatus 100 for generating the first control signal FCS in response to the fixed frequency oscillator signal FFOS, and a particular edge 102 (e.g., the leading edge) of an incoming horizontal sync signal pulse IHSSP. The horizontal sync signal IHSS applied to the input terminal of the control signal generating apparatus 100 is a continuous-time analog signal. The horizontal sync signal IHSS may be derived from the conventional horizontal phase locked loop circuits of the TV receiver.

Figure 3:
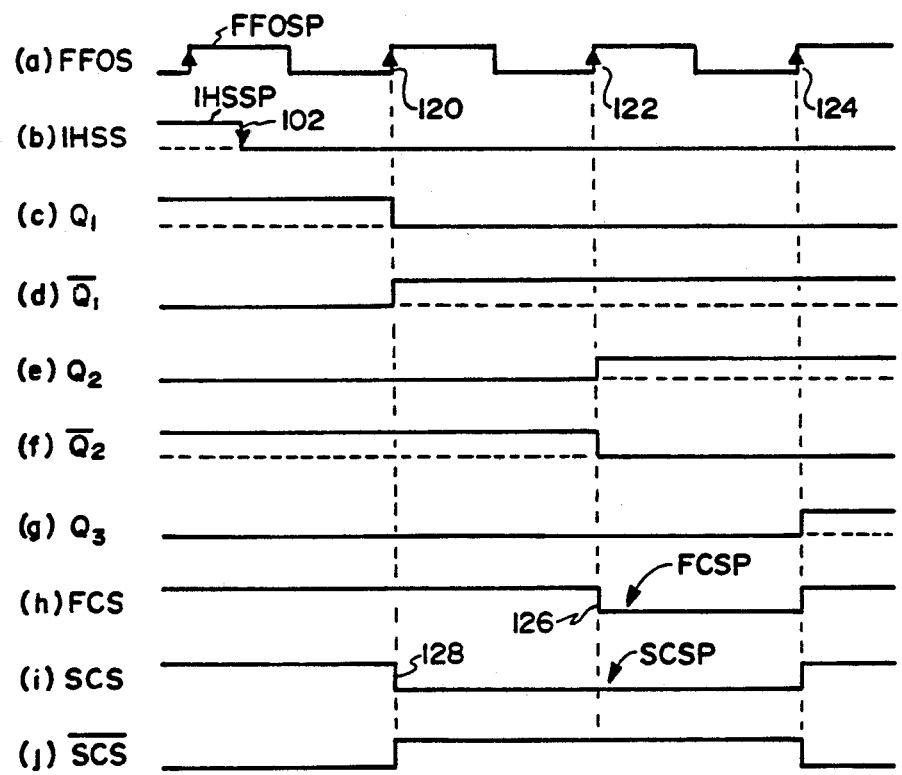
FIG. 3 illustrates signal waveforms useful in understanding the operation of the FIG. 2 control signal generating apparatus.

The control signal generating apparatus 100 includes a plurality of D flip-flops 104, 106 and 108, and a pair of OR gates 110 and 112. The operation of the control signal generating apparatus 100 will be explained in conjunction with the waveforms illustrated in FIG. 3.

The fixed frequency oscillator signal FFOS (waveform 3.$a$) is applied to the clock input terminals of the flip-flops 104-108. The leading edge 102 (waveform 3.$b$) of an incoming horizontal sync signal pulse IHSSP is coupled to the data input terminal $D_1$ of the first flip-flop 104. The $Q_1$ and $\overline{Q}_1$ outputs (waveforms 3.$c$ and 3.$d$) of the first flip-flop 104 are applied to an input terminal of the OR gate 112 and the data input terminal $D_2$ of the second flip-flop 106, respectively. The $Q_2$ and $\overline{Q}_2$ outputs (waveforms 3.$e$ and 3.$f$) are coupled to the data input terminal $D_3$ of the third flip-flop 108 and an input terminal of the OR gate 110, respectively. The $Q_3$ output (waveform 3.$g$) of the third flip-flop 107 is applied to the respective input terminals of the OR gates 110 and 112. The first and second control or timing signals FCS and SCS (waveforms 3.$h$ and 3.$i$) are generated at the output terminals 114 and 116 of the OR gates 110 and 112, respectively. The waveform 3.$j$ shows the complement $\overline{SCS}$ of the second control signal SCS.

As will be seen from the waveform 3.$h$, the first control signal FCS extends from the second rising edge 122 of the fixed frequency oscillator signal FFOS (following the occurrence of the leading edge 102 of an incoming horizontal sync signal pulse IHSSP) and the third rising edge 124 thereof. The second control signal SCS, on the other hand, extends from the first rising edge 120 to the third rising edge 124 of the fixed frequency oscillator signal FFOS in the manner illustrated in the waveform 3.$i$. The leading edge 126 of the first control signal pulse FCSP occurs after the leading edge 128 of the associated second control signal pulse SCSP.

As previously indicated, the divider 30 consists of a divide-by-m circuit 40 and a JK flip-flop 50. The output $Q_4$ of the toggle flip-flop 48 of the divide-by-m circuit 40 is applied to the clock input terminal of the JK flip-flop 50 via an AND gate 66. The second control signal SCS is coupled to the J and K input terminals of the flip-flop 50. The application of the second control signal SCS to the J and K input terminals of the flip-flop 50 prevents a change in its Q output (i.e., MCS signal) while the divide-by-m circuit 40 is being reset once every line in response to the first control signal FCS.

Pursuant to another aspect of the FIG. 1 clock signal generating apparatus 20, a circuit 60 is provided for aligning the next predetermined transition (i.e., rising or falling) of each skew corrected clock signal pulse MCSP (occurring after every incoming horizontal sync signal pulse IHSSP), regardless of the output state $Q_5$ of the JK flip-flop 50 during the reset operation. The function of the aligning circuit 60 is explained below with the help of the waveforms in FIGS. 4 and 5.

The aligning circuit 60 includes a JK flip-flop 62, an OR gate 64 and an AND gate 66. The J and K input terminals of the flip-flop 62 are respectively biased at a logical one state (+5 V) and a logical zero state (ground). The clock input terminal of the JK flip-flop 62 is coupled for receiving the output signal $Q_4$ of the toggle flip-flop 48.

The OR gate 64 has input terminals coupled for receiving the second control signal SCS and the output signal $Q_5$/MCS of the JK flip-flop 50, and has an output terminal coupled to the reset terminal of the JK flip-flop 62. The AND gate 66 has input terminals coupled for receiving the output signal $Q_4$ of the toggle flip-flop 48 and the output signal $Q_5''$ of the JK flip-flop 62. The output of the AND gate 66 is applied to the clock input terminal of the JK flip-flop 50.

Figure 4:
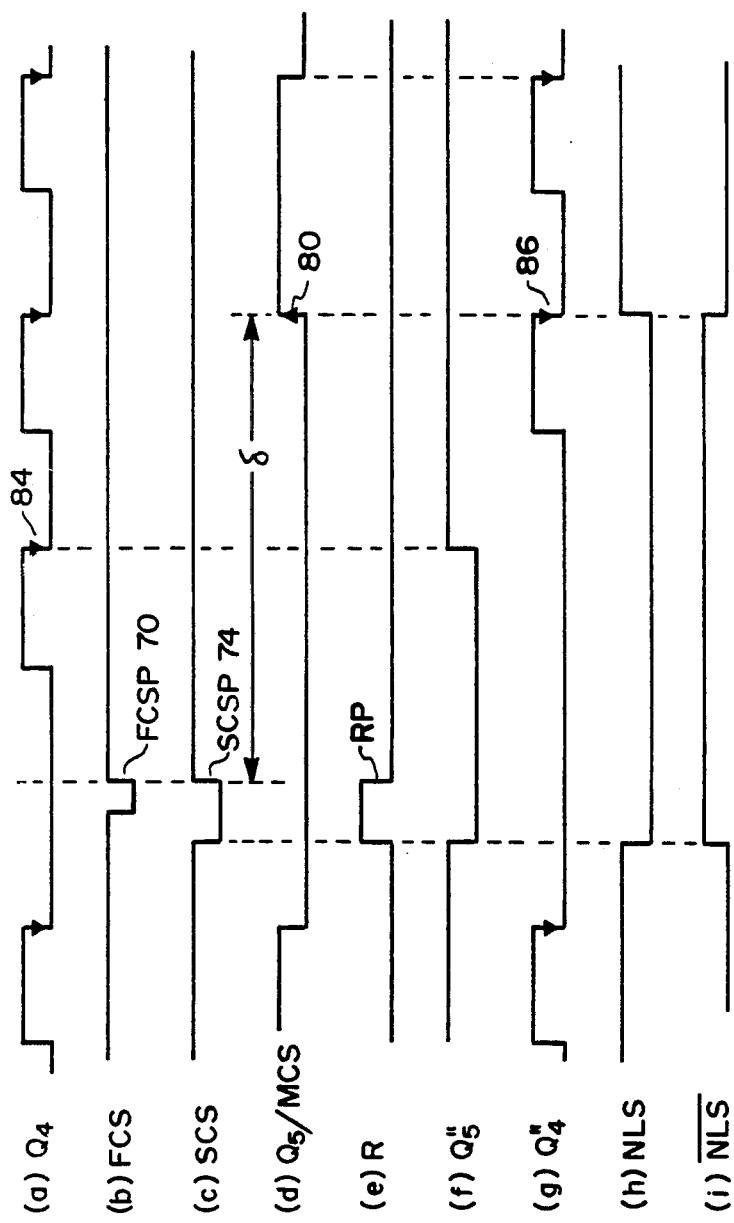
FIGS. 4 and 5 represent signal waveforms useful in describing the function of the FIG. 1 clock signal generating apparatus.
Figure 5:
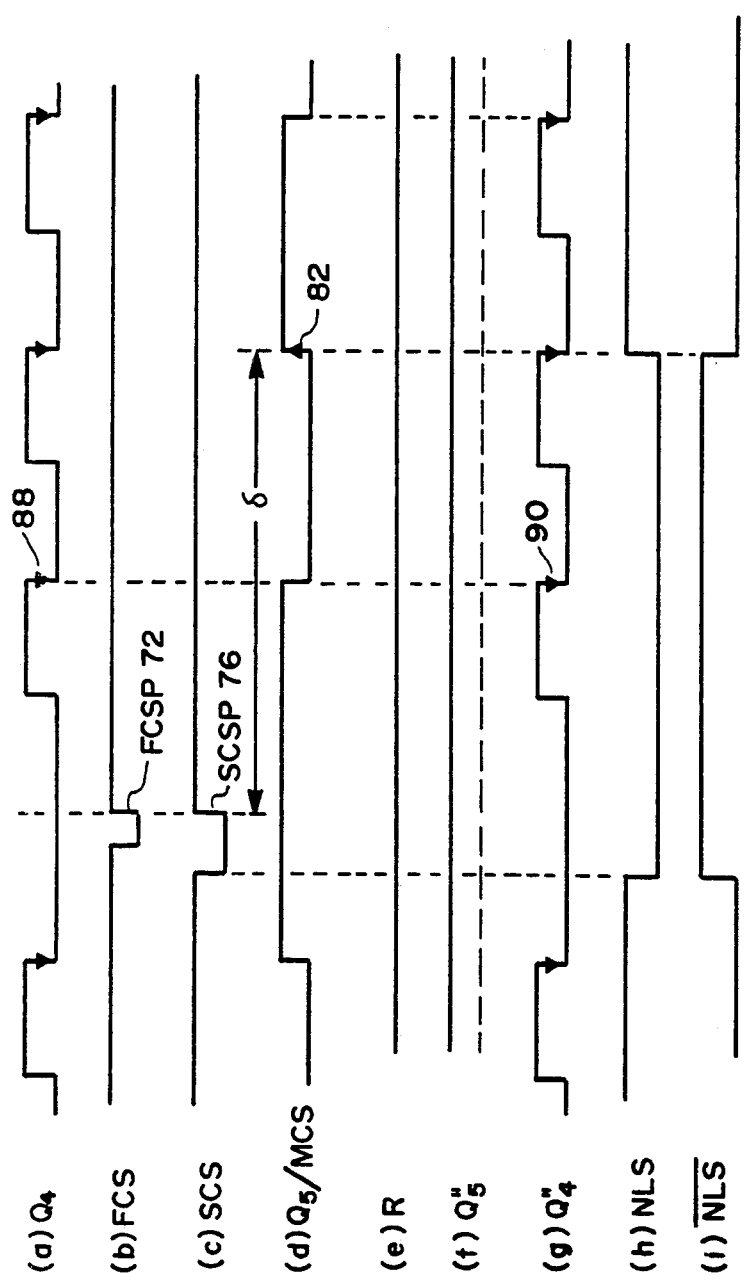
Figure 6:
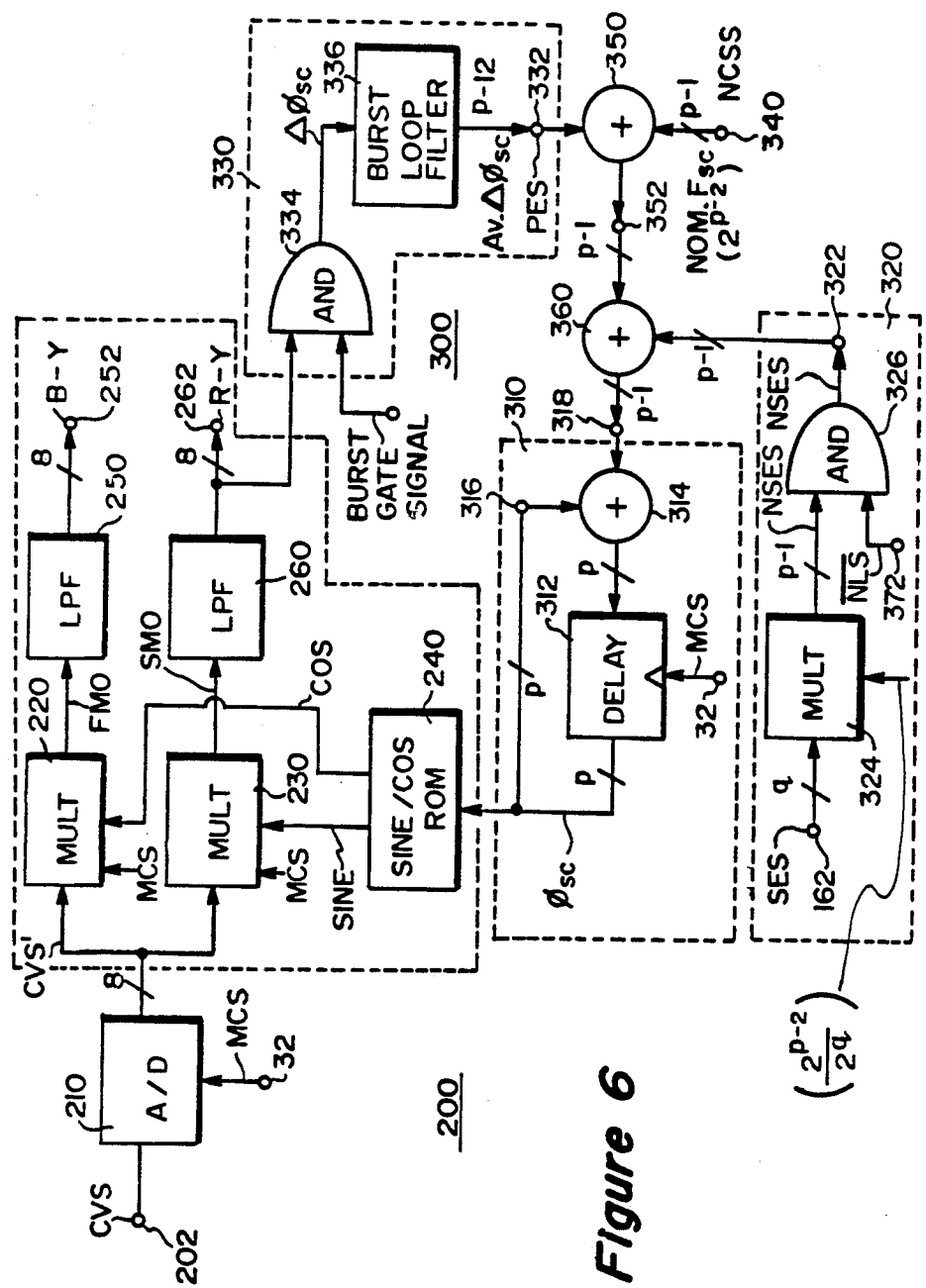
FIG. 6 is a block diagram of a chroma demodulation apparatus for use with the skew corrected clock signal MCS, and the accompanying skew error signal SES, in accordance with the principles of the present invention.

FIG. 4 shows a situation where the control signals FCS and SCS (waveforms 4.b and 4.c) occur while the clock signal $Q_5$/MCS (waveform 4.d) is low. FIG. 5 depicts the situation where the control signals FCS and SCS (waveforms 5.b and 5.c) occur while the clock signal $Q_5$/MCS (waveform 5.d) is high. It will be seen that the very first rising edges 80 and 82 of the clock signal MCS occur after a fixed time interval "δ" following the termination of the first control signal pulses FCSP's 70 and 72, respectively. This is true regardless of whether the clock signal MCS is low or high at the time of the occurrence of the control or timing signals FCS and SCS.

The waveform 4.a depicts the output signal $Q_4$ of the divide-by-m circuit 40. The toggle flip-flops 42–48 of the divide-by-m circuit 40 are reset by the first control signal FCS (waveform 4.b). Once the reset pulse FCSP 70 is removed, the output $Q_4$ of the divide-by-m circuit 40 follows the regular pattern shown by the waveform 4.a (i.e., one falling edge 84 of the $Q_4$ signal for every m cycles of the FFOS signal).

The reset pulse RP (waveform 4.e) causes the output signal $Q_5''$ (waveform 4.f) of the JK flip-flop 62 to go low. The signal $Q_5''$ remains low until the occurrence of the first negative going edge 84 of the signal $Q_4$ (waveform 4.a) applied to the clock input terminal of the JK flip-flop 62, at which time the signal $Q_5''$ goes high.

The signal $Q_4''$ (waveform 4.g) at the output of the AND gate 66 follows the input signal $Q_4$ (waveform 4.a) when the other input signal $Q_5''$ (waveform 4.f) from the JK flip-flop 62 is high. When the J and K input terminals of the flip-flop 50 are low (i.e., SCS is low), its output $Q_5$ remains low. When the J and K input terminals of the flip-flop 50 are high (i.e., SCS is high), every negative going edge of the clock input signal $Q_4''$ causes the flip-flop 50 to change its output state $Q_5$. The output (waveform 4.d) of the JK flip-flop 50 is the skew corrected clock signal MCS.

As previously indicated, the waveforms in FIG. 5 illustrate a situation where the control signals FCS and SCS (waveforms 5.b and 5.c) occur while the clock signal $Q_5$/MCS (waveform 5.d) is high. The waveforms 5.a, 5.b and 5.c depicting the signals $Q_4$, FCS and SCS are the same as the respective waveforms 4.a, 4.b and 4.c in FIG. 4.

The output $Q_5''$ (waveform 5.f) of the JK flip-flop 62 remains high, because the flip-flop 62 is not reset. The output $Q_4''$ (waveform 5.g) of the AND gate 66 follows the output signal $Q_4$ (waveform 5.a) of the divide-by-m circuit 40. Since the J and K inputs of the flip-flop 50 are high (i.e., SCS is high), every falling edge of the clock input signal $Q_4''$ (waveform 5.g) triggers the JK flip-flop 50. The waveform 5.d depicts the output MCS of the JK flip-flop 50. It will be noted that the very first rising edge 82 of the clock signal MCS occurs the same time interval "δ" after the divide-by-m circuit 40 is reset in response to the first control signal FCS.

The clock generating apparatus 20 further includes means 150 coupled to the divider 30 for capturing and saving the current state SES thereof before the divider is reset every horizontal line in response to the first control signal FCS. The state signal SES (which represents the divider count at the time the divider 30 is reset) is indicative of the skew or phase error of the clock signal MCS relative to the associated horizontal sync pulse IHSSP at the start of each picture line. The state capturing means 150 comprises of a plurality of D flip-flops 152, 154 . . . 158 and 160 having their D input terminals coupled for receiving the respective output states $Q_1$, $Q_2$ . . . $Q_4$ and $\overline{Q}_5$ of the divider flip-flops 42, 44 . . . 48 and 50. The complement $\overline{SCS}$ (waveform 3.j) of the second control signal SCS is applied to all of the clock input terminals of the state capturing flip-flops 152–160.

The current state SES of the divider flip-flops 42–50, indicative of the skew or phase error, is latched into the respective flip-flops 152–160 in response to the $\overline{SCS}$ signal. From FIG. 3, it will be seen that the leading edge 128 of the second control signal pulse SCSP (waveform 3.i) occurs prior to the leading edge 126 of the first control signal pulse FCSP (waveform 3.h). This allows the state capturing means 150 to save the current state SES of the divider 30 before it is reset by the first control signal FCS.

The skew corrected clock signal MCS and the skew error signal SES are utilized in the chroma demodulation apparatus 200 in accordance with the principles of the present invention. The incoming composite video signal CVS is applied to the input terminal 202 of an analog-to-digital (A/D) converter 210. The A/D converter 210 generates 8-bit digital representations CVS' of the incoming video signal CVS at a rate determined by the skew corrected clock signal MCS.

The digital samples CVS' are applied to a pair of multipliers 220 and 230, where they are multiplied by the respective cosine and sine values of the phase angle $\phi_{sc}$ of a burst locked color subcarrier signal, where $\phi_{sc} = \omega_{sc}.t$ or $2\pi F_{sc}.t$. The output FMO and SMO of the first and second multipliers 220 and 230 can be represented as follows:

$$FMO = (B-Y) + \text{double frequency (2 } F_{sc}\text{) components} \quad 1$$

$$SMO = (R-Y) + \text{double frequency (2 } F_{sc}\text{) components} \quad 2$$

In the above equations, (B-Y) and (R-Y) are color difference signals, and the double frequency components are signal components having twice the color subcarrier frequency $F_{sc}$. A pair of lowpass filters 250 and 260 are coupled to the respective multipliers 220 and 230 for eliminating undesirable double frequency (2.$F_{sc}$) components from the respective outputs thereof.

The sine and cosine values applied to the multipliers 220 and 230 are generated by a random access, read only memory (ROM) 240 in response to the instantaneous phase $\phi_{sc}$ of an internally-generated signal phase locked to the color subcarrier signal. The description of how the phase angle information $\phi_{sc}$ is generated is given later.

The chroma demodulation apparatus 200 includes a circuit 300 for generating the phase angle $\phi_{sc}$ of a burst-locked, color subcarrier representative signal. The circuit 300 comprises a discrete time oscillator (DTO) 310, means 320 for compensating for once-a-line discontinuities in the skew corrected clock signal MCS, and means 330 for compensating for the phase error between the internally generated $\phi_{sc}$ signal and the burst signal BS included in the incoming composite video signal CVS. The DTO 310 includes a delay element 312 and an adder 314. The delay element 312 consists of a plurality (p) of D flip-flops, which are clocked with the master clock signal MCS. At each clock period, the adder 314 adds to the p-bit previous sum (at a first input terminal 316) a (p-1) bit increment (at a second input terminal 318). Only p bits of the adder output are latched by the D flip-flops, thereby forming a modulo ($2^p$) accumulator.

The increment at the terminal 318 consists of the sum of:

a (p-1) bit value NCSS on terminal 340 representative of the nominal color subcarrier frequency $F_{sc}$ (i.e., 3.58 MHz in the NTSC format), a (p-1) bit value NSES on terminal 322 representative of the normalized value of the q-bit skew error signal SES, once every line, and (p-12) active bit value PES on terminal 332 representative of the phase error $\Delta\phi_{sc}$ between the internally-generated, color subcarrier representative signal $\phi_{sc}$ and the burst signal BS included in the incoming composite video signal CVS.

The value of p is selected so as to obtain the desired degree of resolution in the production of the color subcarrier representative signal $\phi_{sc}$. The relationship between the resolution r in Hz. (e.g., 30 Hz.), the nominal clock frequency $F_{MCS}$ (e.g., 14.3 MHz in the NTSC format) and the number of bits p is given below:

$$r = F_{MCS}/2^p.$$

In this particular embodiment, p is 20 bits.

An adder 350 adds the phase error signal PES on the terminal 332 to the nominal value NCSS of the color subcarrier frequency $F_{sc}$ on the terminal 340. Another adder 360 adds the normalized value of the skew error signal NSES on the terminal 322 to the output of the adder 350, once every horizontal line.

Consider the following illustrative situation:
p = 8 bits
q = 5 bits
Phase Error Signal PES = 0
Normalized Skew Error Signal NSES = 0
Nominal frequency of the master clock signal MCS is 4 $F_{sc}$ Nominal digital value representative of the color subcarrier signal is given below:

$$\begin{aligned} NCSS &= 2^p/4 \\ &= 2^{p-2} \\ &= 2^6 \\ &= 0100\ 0000 \end{aligned}$$

Under these circumstances, the output of adder 314 is incremented by a constant increment 0100 000 at each clock period until overflow occurs when the adder output requires p+1 of 9 bits. After overflow, the cycle repeats. The DTO output sequence is given below:

| CLOCK NO. | DTO OUTPUT ADDER OUTPUT |
|---|---|
| 1 | 0000 0000 |
| 2 | 0100 0000 |
| 3 | 1000 0000 |
| 4 | 1100 0000 |
| 5 | 0000 0000 |
| 6 | 0100 0000 |
| 7 | 1000 0000 |
| 8 | 1100 0000 |
| 9 | 0000 0000 |
| . | . |
| . | . |
| . | . |

From the above table, it can be seen that the output of the DTO 310 is a sawtooth type response, which cycles through a set of four values (0000 0000, 0100 0000, 1000 0000 and 1100 0000) at the $F_{sc}$ rate (i.e., one cycle for every 4 clock pulses). In this illustrative example, the DTO output values are established by the NCSS value (i.e., 0100 0000), which represents the nominal value of the color subcarrier signal frequency $F_{sc}$. As previously indicated, both PES and NSES values are assumed to be zero.

The functional block 320 comprises of a multiplier 324 and an AND gate 326. The multiplier 324 provides a (p-1) bit normalized digital value NSES by multiplying the q-bit skew error signal SES by a normalizing factor $NF = 2^{p-q}/4$. Since the normalizing factor NF is an integer power of 2, the multiplication function can be realized by simple bit shifting.

One input of the AND gate 326 is coupled for receiving the p-1 bit normalized skew error signal NSES. The complement $\overline{NLS}$ (4.i and 5.i) of a new line signal NLS is applied to the other input of the AND gate 326. The AND gate 326 provides the normalized skew error signal NSES at its output terminal 322, once every horizontal line, in response to the $\overline{NLS}$ signal. Addition of the normalized skew error signal NSES to the nominal value NCSS of the color subcarrier signal compensates the DTO output $\phi_{sc}$ for the stretching of clock pulses MCSP's at the start of every horizontal line.

A D flip-flop 370, shown in FIG. 7, provides the $\overline{NLS}$ signal. The D input terminal of the flip-flop 370 is biased at a logical one state (+5 V). The clock signal MCS and the second control signal SCS are applied to the clock input terminal and the reset terminal of the flip-flop 370, respectively. The waveforms 4.i and 5.i show the $\overline{NLS}$ signal at the output terminal 372 of the flip-flop 370.

The functional block 330 comprises an AND gate 334 and a burst loop filter 336. The AND gate 334 has input terminals coupled for receiving the signal at the terminal 262 and the burst gate signal BGS. The burst gate signal BGS is a logical one during the burst segment of the incoming composite video signal CVS. When BGS is a logical one, the AND gate 334 provides, at the output thereof, the output of the lowpass filter 260. During this interval, the output of the lowpass filter 260 represents the phase error $\Delta\phi_{sc}$ between the internally-generated, color subcarrier representative signal $\phi_{sc}$ and the burst signal BS included in the incoming composite video signal CVS.

When the internally generated $\phi_{sc}$ signal is in phase with the burst signal BS, the output of the lowpass filter 260 is zero. When the $\phi_{sc}$ signal leads to BS signal, the output of the lowpass filter 260 is negative. On the other hand, when the $\phi_{sc}$ signal lags the BS signal, the output of the lowpass filter 260 is positive.

The burst loop filter 336 produced a weighted average PES (e.g., $\Sigma w_i\cdot\Delta\phi_{sc}$) of the output $\Delta\phi_{sc}$ of the AND gate 334 over several cycles of the burst signal BS. Addition of a positive or a negative phase error value PES to the nominal value NCSS of the color subcarrier signal, respectively, speeds up or slows down the DTO output frequency in a manner that causes the DTO output $\phi_{sc}$ to synchronize with the burst signal BS.

The ROM 240 generates sine and cosine function values for the phase angles represented by the $\phi_{sc}$ values applied to the address input port of the ROM. The relationship between the phase angle of the color subcarrier signal and the $\phi_{sc}$ input of the ROM 240 is given below:

$$\text{phase angle} = \phi_{sc}/2^p \times 2\pi,$$

where $\phi_{sc}$ represents a positive number.

In summary, the circuit 300 generates a burst locked color subcarrier representative signal $\phi_{sc}$ from the non-continuous, skew corrected clock signal MCS for use in the chroma demodulation apparatus 200. The DTO 310 provides a modulo ($2^p$) output, representative of the burst locked, color subcarrier representative signal $\phi_{sc}$. The functional block 320 compensates for the once-a-line discontinuities in the skew corrected clock signal MCS. The functional block 330 corrects for phase errors between the internally generated $\phi_{sc}$ signal and the color burst signal BS included in the incoming composite video signal CVS.

What is claimed is:

1. An apparatus for generating a color subcarrier representative signal $\phi_{sc}$ from a skew corrected clock signal MCS; said skew corrected clock signal having its phase adjusted periodically and having a constant frequency $L \times F_{sc}$ (where L is a constant and $F_{sc}$ is the frequency of said color subcarrier signal) between successive phase adjustments; said apparatus being additionally responsive to a q-bit skew error signal SES indicative of said periodic phase adjustments; said apparatus comprising:
   a discrete time oscillator (DTO), having a capacity for p bits and responsive to said skew corrected clock signal MCS, for adding at each clock period an incremental value to the modulo ($2^p$) previous sum; the p-bit output of said DTO being representative of said $\phi_{sc}$ signal;
   means for providing a fixed digital value ($2^p/L$) representative of said color subcarrier frequency $F_{sc}$;
   means for providing (a) a normalized digital value (SES $\times$ ($2^{p-q}/L$)) of said skew error signal SES once every phase adjustment period by multiplying said skew error signal by a normalizing factor (NF=$2^{p-q}/L$), (b) and a zero value otherwise; and
   means for generating said incremental value by additively combining said color subcarrier frequency representative value with said normalized value of said skew error signal SES once every phase adjustment period.

2. The apparatus defined in claim 1 wherein said discrete time oscillator comprises:
   an adder having an output terminal and a pair of input terminals; one of said adder input terminals coupled for receiving said incremental value; and
   a delay element having an input terminal coupled to said adder output terminal and responsive to said skew corrected clock signal MCS, for delaying the output of said adder by one clock period; the output of said delay element, representative of said $\phi_{sc}$ signal, being coupled to a second input terminal of said adder.

3. The apparatus defined in claim 2 wherein said delay element comprises the same plurality (p) of flip-flops having their data inputs coupled for receiving the respective bits of said adder output, and having their respective clock inputs coupled for receiving said skew corrected clock signal MCS.

4. The apparatus defined in claim 3 wherein said means for providing said once-a-period normalized value of said skew error signal SES comprises:
   means for multiplying said skew error signal SES by a normalizing factor NF to generate said normalized value;
   means coupled to said multiplying means for gating said normalized value to an output terminal thereof once every phase adjustment period for application to said incremental value generating means.

5. The apparatus defined in claim 4 further including means for generating a timing signal every time said phase of said skew corrected clock signal MCS is adjusted; wherein said gating means comprises an AND gate having a pair of input terminals, and having an output terminal coupled to said incremental value generating means; one of said input terminals of said AND gate being coupled to said output of said multiplying means for receiving said normalized value of said skew error signal SES; the other input terminal of said AND gate being coupled for receiving said timing signal for causing said AND gate to pass said normalized value to said incremental value generating means every time said phase of said skew corrected clock signal MCS is adjusted, and to pass a zero value otherwise.

6. In a digital TV receiver having an analog-to-digital (A/D) converter for converting an incoming composite video signal CVS into digital representations thereof in response to a skew corrected clock signal MCS; said composite video signal CVS including horizontal and vertical synchronizing components and a color subcarrier burst signal component; said skew corrected clock signal having its phase adjusted once every horizontal line, and having a constant frequency $L \times F_{sc}$ (where L is a constant and $F_{sc}$ is the frequency of said burst signal) between successive phase adjustments; said TV receiver additionally including means for generating a skew error signal SES indicative of said once-a-line phase adjustments; said TV receiver further having a chroma demodulation apparatus comprising:
   means, responsive to said skew corrected clock signal MCS and said skew error signal SES, for internally generating a non-discontinuous, color subcarrier representative signal $\phi_{sc}$ locked in phase with said burst signal component of said composite video signal CVS; and means coupled for receiving said digital representations of said composite video signal CVS and responsive to said internally-generated color subcarrier representative signal $\phi_{sc}$ for generating at least one color difference component of said composite video signal.

7. The chroma demodulation apparatus defined in claim 6 wherein said means for generating said color difference component comprises:

a read-only-memory (ROM) coupled for receiving said color subcarrier representative signal $\phi_{sc}$ for generating associated sine values;

means for multiplying said digital representations of said composite video signal CVS by the respective sine values for generating, at an output terminal thereof, an (R-Y) color difference signal and associated high frequency components; and a lowpass filter coupled to said sine multiplying means for providing, at an output terminal thereof, said (R-Y) color difference signal to the relative exclusion of said associated high frequency components.

8. The chroma demodulation apparatus defined in claim 7 wherein said ROM, coupled for receiving said color subcarrier representative signal $\phi_{sc}$, additionally provides cosine values; said chroma demodulation apparatus further including:

means for multiplying said digital representations of said composite video signal CVS by the respective cosine values for generating, at an output terminal thereof, a (B-Y) color difference signal and associated high frequency components; and a lowpass filter coupled to said cosine multiplying means for providing, at an output terminal thereof, said (B-Y) color difference signal to the relative exclusion of said associated high frequency components.

9. The chroma demodulation apparatus as defined in claim 6 wherein said color subcarrier representative signal ($\phi_{sc}$) generating means comprises:

a discrete time oscillator (DTO), having a capacity for p bits and responsive to said skew corrected clock signal MCS, for adding at each clock period an incremental value to its previous output, representative of said $\phi_{sc}$ signal, until overflow occurs when the value representative of the sum of said previous output and said incremental value exceeds p bits;

means for providing a fixed digital value ($2^p/L$) representative of said color subcarrier frequency $F_{sc}$;

means for providing (a) a normalized digital value (SES×($2^{p-q}/L$)) of said skew error signal SES once every horizontal line by multiplying said skew error signal by a normalizing factor (NF=$2^{p-q}/L$), (b) and a zero value otherwise;

means for providing a value $\Delta\phi_{sc}$ indicative of the phase difference between said internally generated $\phi_{sc}$ signal and said burst signal component of said composite video signal CVS; and means for generating said incremental value by additively combining said color subcarrier frequency representative value, said once-a-line normalized value of said skew error signal SES and said phase difference value $\Delta\phi_{sc}$.

10. The apparatus defined in claim 9 wherein said discrete time oscillator comprises:

an adder having an output terminal and a pair of input terminals one of said adder input terminals coupled for receiving said incremental value; and a delay element having an input terminal coupled to said adder output terminal and responsive to said skew corrected clock signal MCS, for delaying the output of said adder by one clock period; the output of said delay element, representative of said $\phi_{sc}$ signal, being coupled to a second input terminal of said adder.

11. The apparatus defined in claim 10 wherein said means for providing said once-a-line normalized value of said skew error signal SES comprises:

means for multiplying said skew error signal SES by a normalizing factor NF to generate said normalized value;

means, coupled to said multiplying means, for gating said normalized value NF to an output terminal thereof once every horizontal line period for application to said incremental value generating means.

12. The apparatus defined in claim 11 wherein said means for generating said color difference component comprises:

a read-only-memory (ROM) coupled for receiving said color subcarrier representative signal $\phi_{sc}$ for generating associated sine values;

means for multiplying said digital representations of said composite video signal CVS by the respective sine values for generating, at an output terminal thereof, an (R-Y) color difference signal and associated high frequency components; and lowpass filter coupled to said multiplying means for providing, at an output terminal thereof, said (R-Y) color difference signal to the relative exclusion of said associated high frequency components.

13. The apparatus defined in claim 12 wherein said phase difference signal ($\Delta\phi_{sc}$) providing means comprises:

an AND gate having a first input terminal thereof coupled for receiving the output said lowpass filter and a second input terminal thereof coupled for receiving a burst gate signal BGS; said burst gate signal BGS being indicative of the presence of said burst signal component in said composite video signal CVS; and a burst loop filter for averaging the output of said AND gate over several cycles of said burst signal to generate said phase difference signal $\Delta\phi_{sc}$ at an output thereof.

* * * * *